United States Patent [19]
Sofue

[11] Patent Number: 5,875,155
[45] Date of Patent: Feb. 23, 1999

[54] OPTICAL DISK UNIT HAVING REDUCED RECORDING AND REPRODUCING ERRORS

[75] Inventor: Masaaki Sofue, Tokyo, Japan

[73] Assignee: Ricoh Company, Ltd., Tokyo, Japan

[21] Appl. No.: 788,106

[22] Filed: Jan. 23, 1997

[30] Foreign Application Priority Data

Jan. 23, 1996 [JP] Japan .................................... 8-009075

[51] Int. Cl.⁶ .................................................. G11B 11/00
[52] U.S. Cl. ........................... 369/13; 369/32; 369/44.39
[58] Field of Search ........................... 369/32, 13, 44.14, 369/44.26, 44.28, 44.39; 360/114, 59, 44.27, 54, 44.22, 110, 44.31, 44.32, 58, 244

[56] References Cited

U.S. PATENT DOCUMENTS

| | | | |
|---|---|---|---|
| 5,084,661 | 1/1992 | Tanaka | 318/685 |
| 5,331,611 | 7/1994 | Matsuba | 369/13 |
| 5,485,434 | 1/1996 | Chaja | 369/13 |
| 5,581,524 | 12/1996 | Fujino | 369/44.27 |

*Primary Examiner*—Ali Neyzari
*Attorney, Agent, or Firm*—Dickstein Shapiro Morin & Oshinsky LLP

[57] ABSTRACT

An optical disk presents unit an object lens from being affected by an external disturbance caused by a reversed moving direction of an optical head when information is recorded or reproduced to or from an optical disk. The last moving direction of an optical head which has arrived at a target position of an optical disk is detected and, if it is opposite to a moving direction of the optical head for recording or reproducing information, the moving direction is inverted to the recording/reproducing moving direction before the optical head starts recording or reproducing information. At the time when the optical head inverts the moving direction, recording or reproduction of the information is not started. Therefore, no vibration or shock is applied to an object lens at the beginning of a recording or reproducing operation which might cause errors.

13 Claims, 6 Drawing Sheets

OPTICAL DISK UNIT HAVING REDUCED RECORDING AND REPRODUCING ERRORS

FIELD OF THE INVENTION

This invention relates to an optical disk unit for executing at least one of recording and reproduction of information to and from an optical disk.

BACKGROUND OF THE INVENTION

An optical disk is used as a mass storage device and an optical disk unit is used for recording or reproducing information to or from the optical disk. Known types of optical disks include a read-only compact disk (CD) for reproduction, a write-once optical disk (WO) for writing information to the optical disk just once and a magneto optical disk (MO) in which information can be freely recorded or reproduced. In these optical disks, each track is arranged in a fine spiral form in a direction from an inner circumference to an outer circumference forming a direction of recording or reproducing information.

The optical disk unit for recording or reproducing information to or from the optical disk generally includes a turntable directly connected to a driving motor for driving rotation of the optical disk. An optical head for recording or reproducing information to or from the optical disk has a head base, on which a light emitting element, a light receiving element, and an object lens are mounted. The object lens is supported by a lens driving mechanism so as to have a free displacement in a radial and axial direction of the optical disk, and the entire optical head is supported by a head carrying sledge mechanism so as to move freely in a radial direction of the optical disk.

There are two operational steps in recording or reproducing information to or from the optical disk by means of the optical disk unit; one is a target retrieval operation in which an optical head moves to a target position for a recording or reproducing operation and the other is the recording/reproducing operation itself. In other words, the optical head is first moved to a target position of the optical disk by means of the head carrying sledge mechanism in the target retrieval operation, and optical scanning is then executed on the track of the rotationally driven optical disk by means of the optical head in the recording/reproducing operation.

During optical scanning, a minute spot is focused on the track of the optical disk by concentrating emitted light of the light emitting element by means of the object lens, the object lens is appropriately displaced radially by means of the lens driving mechanism in accordance with a minute displacement of the track, and when the limit of the displacement of the object lens is near, the entire optical head is moved by means of the head carrying sledge mechanism and the object lens returned by the lens driving mechanism to a position where it again begins to be displaced as it follows the track. Information is recorded or reproduced to or from the optical disk driving the scanning operation.

If information is recorded into the optical disk by this type of optical disk unit, however, its beginning part may sometimes be lost. This is because when information is recorded into the optical disk, the head carrying mechanism moves the optical head to a target position of the optical disk, and then moves the optical head in the forward direction to record information. If these movement directions are opposite to each other, the object lens is shocked or vibrated when the optical head quickly turns around.

A lens driving mechanism supports the object lens on a lightweight movable part so as to have a free displacement with a low resistance since it is required to displace the object lens precisely and at a high speed and therefore it is not structurally resistant to an external disturbance such as vibration or a shock. On the other hand, a sledge driving mechanism is formed in a simple structure by means of a commercially available servo motor and a gear. Since it serves as a mechanism for moving roughly the entire optical head, it causes a great vibration or shock at the beginning of a carrying operation or when turned around.

Accordingly, if a track of the optical disk is optically scanned from a target position by means of the optical head, the optical scanning may not be favorably started if the moving direction of the optical head is inverted when the scanning operation is started. In this case, the beginning of the information to be recorded may be lost, and in the same manner, an error may also occur during reproduction of the information.

SUMMARY OF THE INVENTION

In one aspect, the invention relates to an optical disk unit which incorporates an operation control system which controls the disk unit to begin a recording or reproduction of information only after an optical head is first moved in a forward direction, if the optical head is moved to the target position in a direction reverse to the forward direction.

More specifically, the invention employs a rotation driving mechanism for driving a rotation of an optical disk having a spiral track, and an optical head having at least a light emitting element, a light receiving element, an object lens, and a lens driving mechanism. The optical head is supported by a head carrying sledge mechanism so as to move freely in a radial direction of the optical disk, and executes at least one of a recording and reproducing of information by optically scanning the track of the optical disk after being moved to the target position by means of the sledge mechanism. The optical head focuses on a spot on the track of the optical disk, and is moved in order in the forward direction by means of the sledge mechnism in accordance with a significant movement of the track. The object lens is displaced appropriately by means of the lens driving mechanism in accordance with a fine displacement of the track. An operation control means is provided for starting a recording or reproduction of information by the optical head after it is moved preparatively in the forward direction by means of the sledge mechanism, if the optical head is moved to the target position of the optical disk in a direction reverse to the forward direction. Accordingly, when information is recorded or reproduced to or from the optical disk, the sledge mechanism moves the optical head to the target position of the optical disk first, and then moves it in the forward direction to scan the track optically. If the optical head arrives at the target position of the optical disk from the reverse direction, the operation control means moves the optical head preparatively in the forward direction by means of the sledge mechanism before the optical head starts to record or reproduce information. Accordingly, when the optical head starts to record or reproduce information, its moving direction is not inverted and no vibration or shock is applied to the object lens.

In another aspect, the invention further includes an optical head which executes both a recording and reproduction of information, but the operation control means functions only when recording information into the optical disk. Therefore, it reliably prevents loss of the beginning information which is to be recorded into the optical disk, and an operation of reproducing information may still be started at a high speed.

In a second embodiment of the invention, the object lens may be displaced in a forward direction relative to the head carrying mechanism by means of the lens driving mechanism when the optical head is moved to the target position in the reverse direction. As a result, when the target position is reached and sensed by the object lens, the sledge mechanism is at that point displaced rearwardly of the target position. Then when the sledge is reversed and moved forwardly in preparation for a recording or reproducing operation the object lens is displaced rearwardly relative to the sledge mechanism. That is, when the sledge mechanism moves the optical head forward in preparation for a recording or reproducing operation the object lens is moved rearwardly to maintain its reading of the target position and a recording or reproducing operation then occurs.

In yet another aspect of the second embodiment, the object lens may not be displaced in a forward direction when the optical head is moved to a target position in a reverse direction. Therefore, if the optical head is to arrive at the target position of the optical disk in the reverse direction the operation control means first moves the object lens in the forward direction by means of the lens driving mechanism before the optical head is moved in the reverse direction to the target position by means of the sledge mechanism. When the target position is reached by the object lens, the sledge mechanism is displaced rearwardly of the target position. Then when the sledge is reversed and moved forwardly in preparation for a recording or reproducing operation the object lens is displaced rearwardly relative to the sledge mechanism to maintain its reading of the target position and a recording or reproducing operation then occurs.

These and other objects, features and advantages of the invention will be better understood from the following detailed description of the invention which is provided in connection with the accompanying drawings.

BRIEF DESCRIPTION OF THE DRAWINGS

FIGS. 3(a), 3(b) and 3(c) show a relationship between the optical disk and an optical head.

FIGS. 6(a) and 6(b) show a sledge driving current.

FIGS. 8(a), 8(b) and 8(c) show a relationship among sledge driving current and an acceleration and a speed of the optical head.

DETAILED DESCRIPTION OF THE INVENTION

Figure 1:
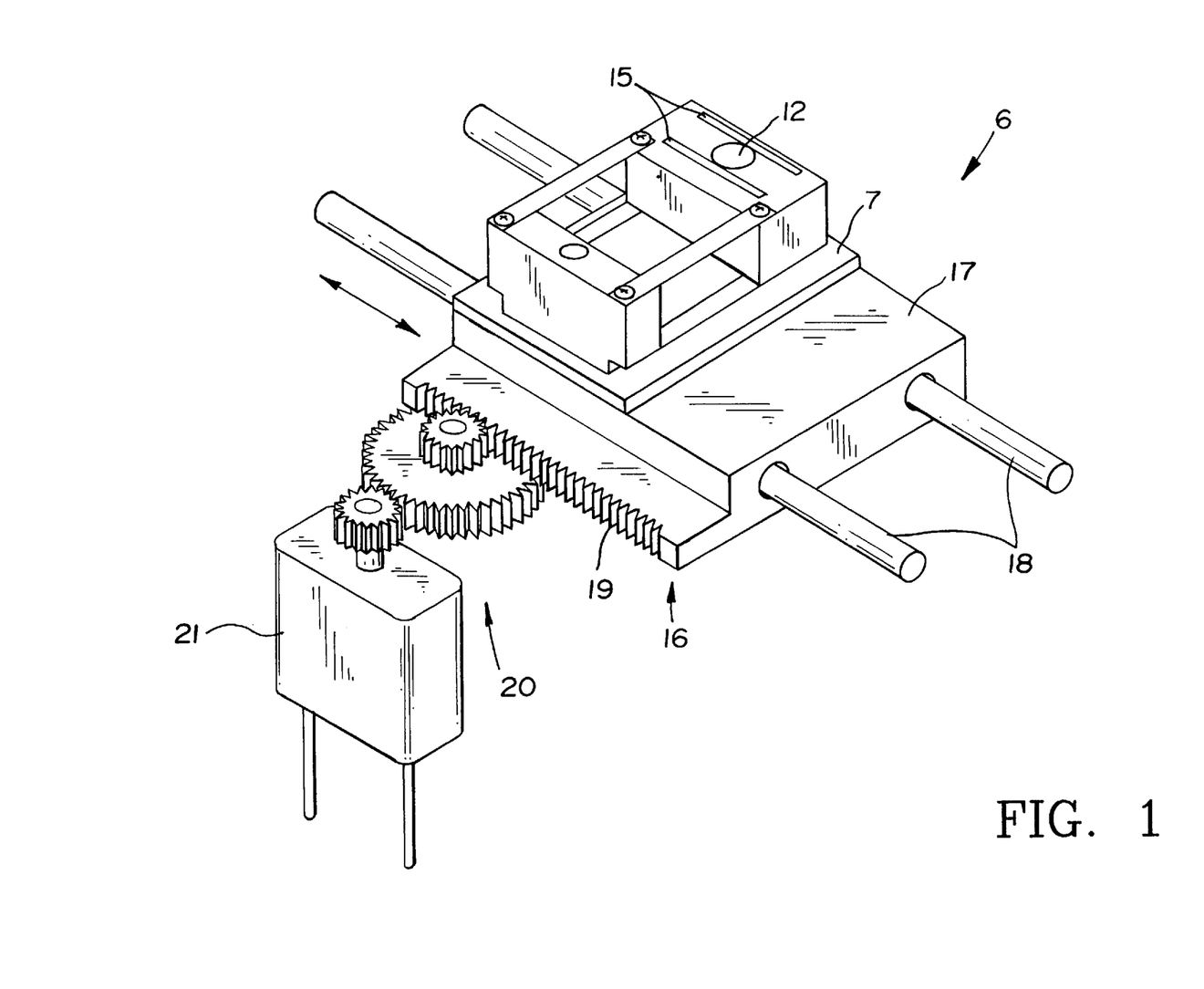
FIG. 1 is a perspective view illustrating an embodiment of an optical disk unit according to the invention.
Figure 2:
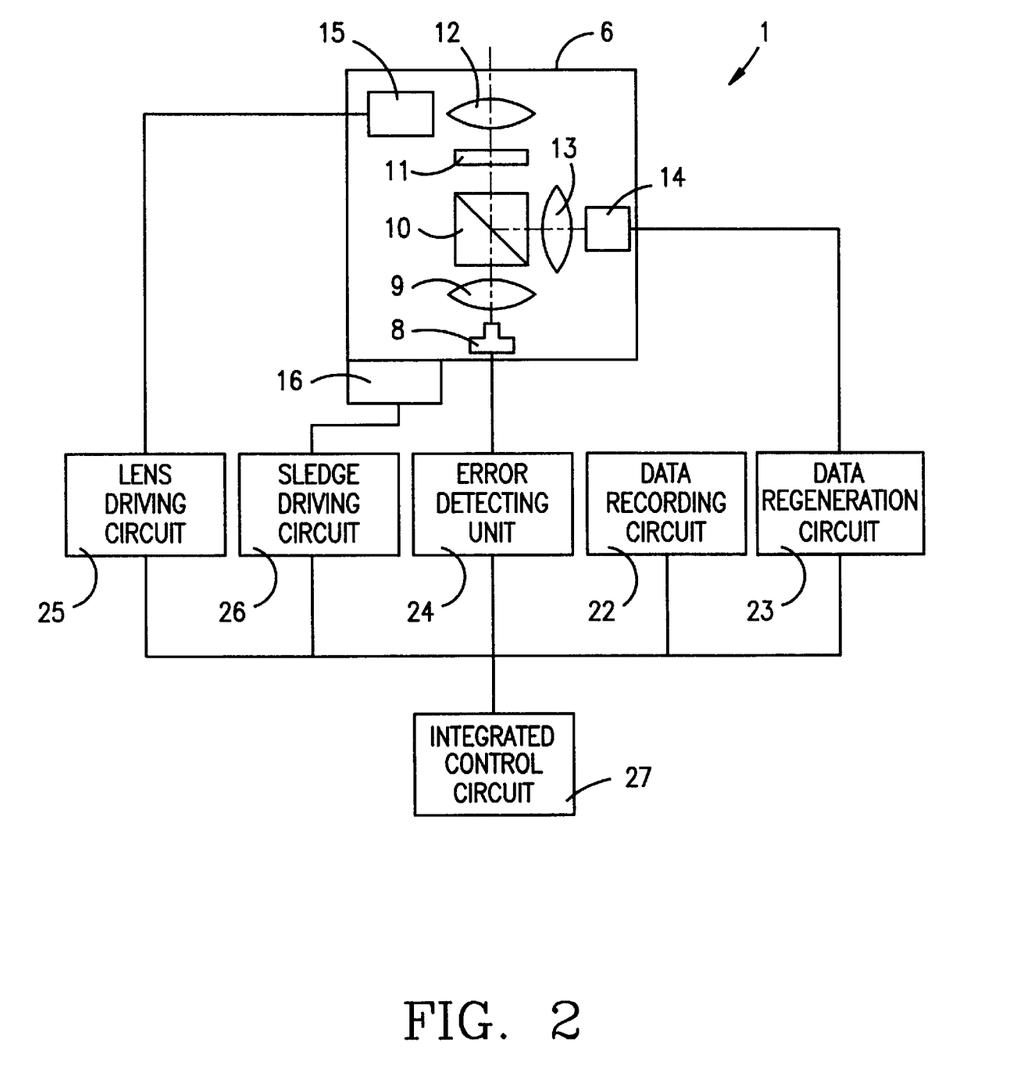
FIG. 2 is a view illustrating a main part of the optical disk unit.
Figures 3A, 3B, 3C, 4:
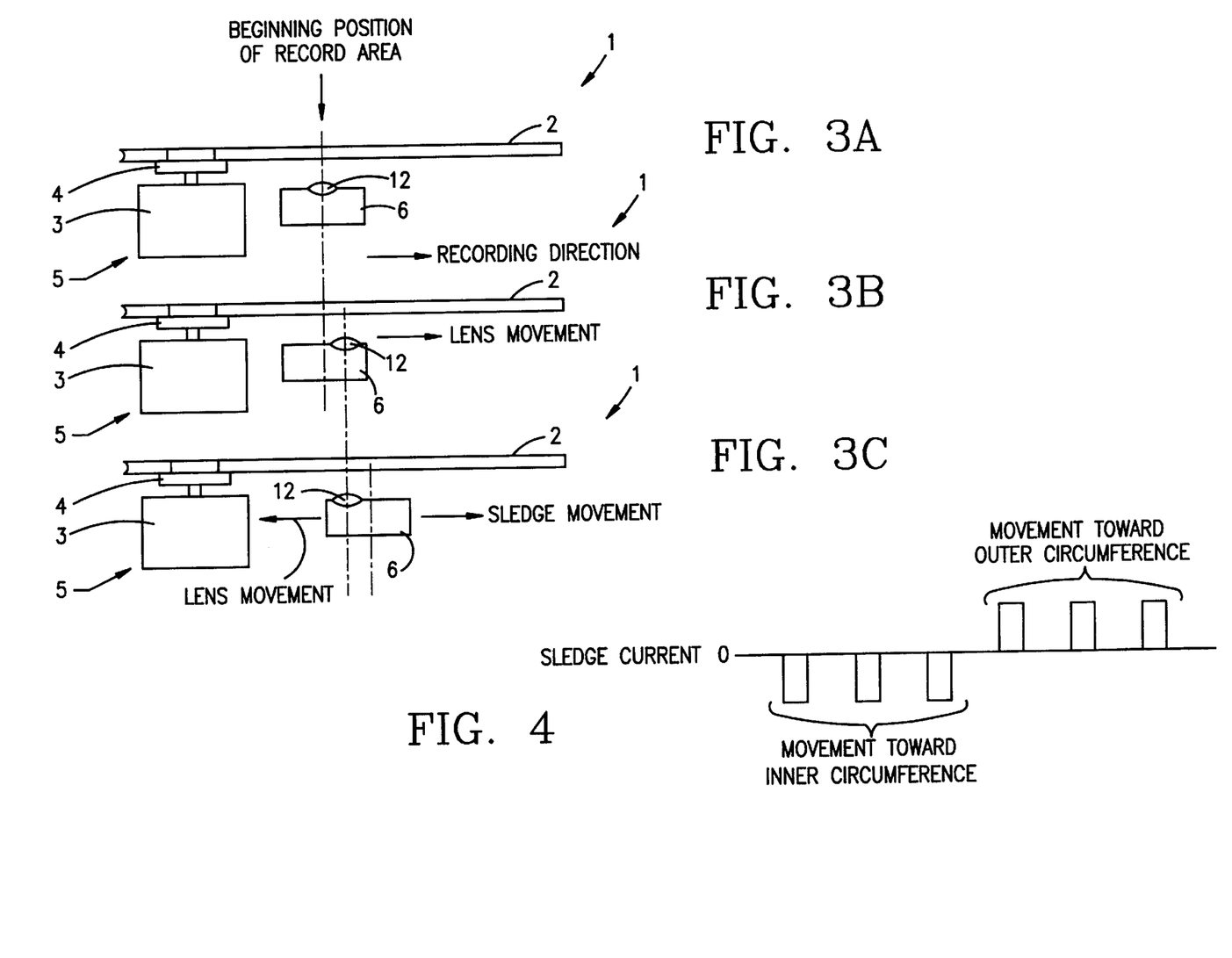
FIG. 3(a) is a typical view illustrating a state when an optical head arrives at a target position.
FIG. 3(b) is a view illustrating a state when an object lens has moved by following a moving track.
FIG. 3(c) is a view illustrating a state when the entire optical head has moved.
FIG. 4 is a timing chart illustrating a sledge driving current for driving a sledge mechanism which carries an optical head.

Referring to FIGS. 1–8, an embodiment of the invention will be described below. First of all, an optical disk unit 1 of this embodiment performs both recording and reproducing of information to and from an optical disk 2. The optical disk 2 contains a track arranged in a spiral form at, for example, a 1.6 ($\mu$m) pitch and information is recorded or reproduced to or from this track in a direction from an inner circumference to an outer circumference. Therefore, as shown in FIG. 3, a rotation driving mechanism 5 is provided by means of a driving motor 3 and a turntable 4, and the rotation driving mechanism 5 supports the optical disk 2 with a shaft enabling it to rotate freely.

As shown in FIGS. 1 and 2, an optical head 6 for recording or reproducing information by optically scanning the optical disk 2 has a head base 7, and a light emitting semiconductor laser 8 fixed to head base 7 and another head base 17. As shown in FIG. 2, a collimator lens 9, a beam splitter 10, a quarter-wavelength plate 11, and an object lens 12 are arranged in order on an optical axis of the semiconductor laser 8, and a light concentration lens 13 and a photodiode 14 which is a light receiving element are arranged in order on a reflected optical path of the beam splitter 10. The object lens 12 is supported by an actuator 15 which is a lens driving mechanism which allows a free displacement at the lens in a tracking (radial) direction and in a focusing (axial) direction. Other optical components are fixed to the head base 7.

The optical head 6 in this structure is supported by a sledge mechanism 16 which is a head carrying mechanism so as to move freely in a radial direction of the optical disk 2. More particularly, the head base 17 of the optical head 6 is supported by a pair of seek shafts 18 arranged in the radial direction of the optical disk 2 so as to move freely, and a sledge motor 21 is linked through a gear mechanism 20 to a rack 19 formed on the front of the head base 17.

The semiconductor laser 8 of the optical head 6 is connected to a data recording circuit 22, which controls an operation of the semiconductor laser 8 in accordance with the information to be recorded into the optical disk 2. The photodiode 14 of the optical head 6 is connected to a data reproducing circuit 23, which reproduces information recorded in the optical disk 2 based on an output signal from the photodiode 14.

The photodiode 14 of the optical head 6 is also connected to an error detection circuit 24, which generates a tracking signal based on the output signal from the photodiode 14. The lens driving circuit 25 displaces the object lens 12 in the radial direction of the optical disk 2 by means of the actuator 15 in accordance with the tracking signal.

The sledge motor 21 is connected to a sledge driving circuit 26, which also moves the optical head 6 in the radial direction of the optical disk by means of the sledge mechanism 16 in accordance with the lens driving current or the tracking signal. More particularly, as shown in FIG. 4, sledge driving current in the form of minus pulses is output if the optical head 6 is moved in a direction from an outer circumference to an inner circumference of the optical disk 2, and the sledge driving current in the form of plus pulses is output if the optical head 6 is moved in a direction from the inner circumference to the outer circumference of the optical disk 2.

The various circuits 22 to 26 are connected to a single integrating control circuit 27, which integrates and controls the various circuits 22 to 26. Control circuit 27 may take the form of a microprocessor executing a control program. The individual structures depicted in FIG. 2 are well known in the art and a detailed description of each is therefore omitted herein.

The optical disk unit 1 of the first embodiment records or reproduces information to or from the optical disk 2 in two operational steps, a first target retrieval operation and a second recording/reproducing operation. In the first target retrieval operation, a beginning position of a record area of the optical disk 2 is set as a target position and the sledge driving circuit 26 drives the sledge mechanism 16 to move the optical head 6 to the beginning position of the record area of the optical disk 2. In the recording/reproducing operation executed after completion of the target retrieval operation, the lens actuator 15 and sledge driving mechanism 16 cooperate so that the optical head 6 follows the track of the optical disk 2 and therefore the optical head 6 starts to optically scan the track of the optical disk 2.

Figure 5:
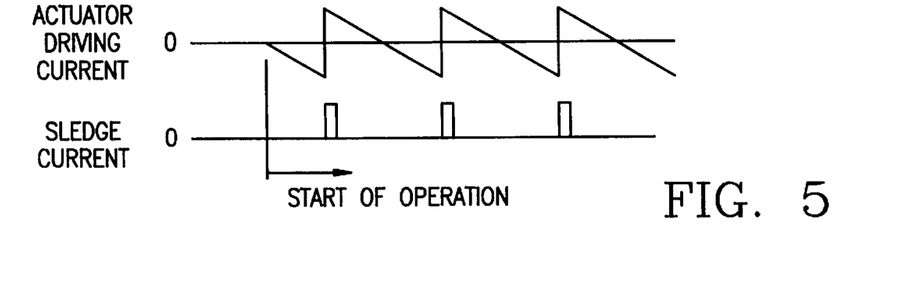
FIG. 5 is a timing diagram illustrating a relationship between a sledge driving current and an actuator driving current for driving an actuator which is a lens driving mechanism when the optical head scans optically a track of the optical disk.

More particularly, the optical head 6 concentrates a light emitted from the semiconductor laser 8 by means of the object lens 12 to focus a minute spot on the track of the optical disk 2, and as shown in FIG. 3a and 3b, displaces the object lens 12 by using the actuator 15 in accordance with a minute displacement due to an eccentricity of the track, and as shown in FIG. 3c moves the entire optical head 6 by using the sledge mechanism 16 and repositions the lens 12 relative to the optical head 6 by using the actuator in accordance with a significant rotation of the spiral track from the last forward movement of sledge mechanism 15. Since the track of the optical disk 2 is made in a spiral form at a given pitch, as shown in FIG. 5, the lens driving circuit 25 and the sledge driving circuit 26 generate driving current in synchronism so that the object lens 12 follows this type of the track. Thus, when a lens 12 reaches the end of its radial movement relative to sledge mechanism 16 the actuator 15 driving current is at its lowest point which triggers a movement of the slide mechanism 16 and a repositioning of the lens 12 relative to the slide mechanism 16 to begin a new radial movement of lens 12 until it again reaches the end of its radial movement and triggers another movement of the sledge mechanism 16.

Since information is recorded or reproduced in a direction from an inner circumference to an outer circumference on the optical disk 2 as described above, the moving direction of the optical head 6 in a recording or reproducing operation is always in the forward direction, while the moving direction of the optical head 6 in a target retrieval operation can be either in a forward or a reverse direction.

In the optical disk unit 1 of a first embodiment, the above-described integrated control circuit 27 includes to an operation control means, which controls the driving of the sledge mechanism 16 by means of the sledge driving circuit 26 to a new target location.

Figure 6A:
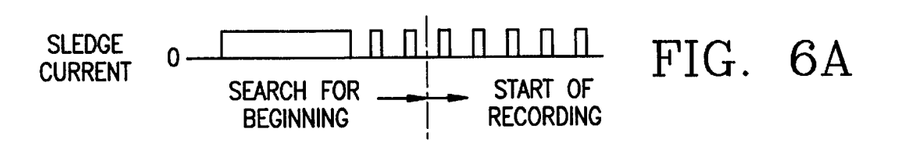
FIG. 6(a) is a timing diagram without modification of a moving direction of the optical head which has arrived at the target position of the optical disk and FIG. 6(b) is a timing diagram with the modification.
Figure 6B:
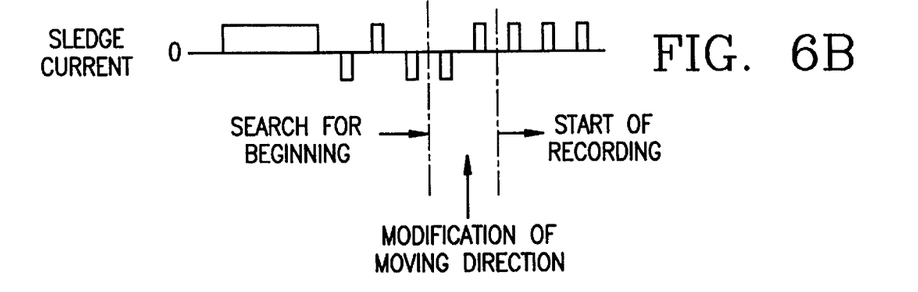
Figure 7:
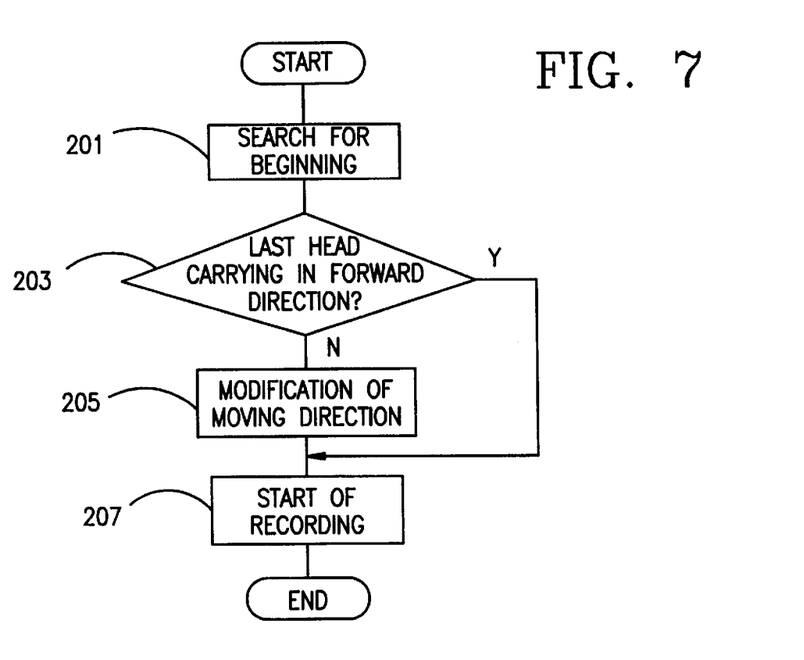
FIG. 7 is a flowchart illustrating a processing operation of an operation control means.

The control procedure for the first embodiment of the invention is shown in FIG. 7. When the optical head 6 is moved to a target position of the optical disk 2 by controlling the sledge mechanism 16, the objective lens 12 searches for the target position at step 201. The sledge driving circuit 26 detects a moving direction of the optical head 6 which arrives at the target position of the optical disk 2 by detecting, in step 203, a sledge driving current output to the sledge mechanism 16 as shown in FIG. 6. If in step 203, the sledge is detected as moving to the target position in a forward direction the direction the processing sequence proceeds to step 207 where a recording or reproducing operation begins. Thus, a recording or reproduction of information is executed if the forward direction is detected as the moving direction in step 203, as shown in FIG. 6(*a*). On the other hand, the optical head 6 is moved preparatively in the forward direction first by means of the sledge mechanism 16 before information begins to be recorded or reproduced if the reverse direction is detected, as shown in FIG. 6(*b*). The modification in moving direction occurs at step 205 of the FIG. 7 sequence, following which a recording or reproducing operation begins at step 207.

More specifically, since the moving direction of the optical head 6 is fixed to the forward direction in a recording or reproducing operation as described above and the moving direction of the optical head 6 in a target retrieval operation is detected based on whether plus or minus current is used as the sledge driving current (FIG. 6), if minus current is used as the last sledge driving current in the target retrieval operation, minus and plus sledge driving currents are output in order from the sledge driving circuit 26 to the sledge mechanism 16 before the recording or reproducing operation is started so as to displace the optical head 6 in the backward direction from the target position and then to the forward direction. In other words, the last moving direction of the optical head 6 is modified to the forward direction before the recording or reproducing operation is started, therefore, the optical head 6 is moved preparatively in the forward direction from this state to start the recording or reproducing operation.

The optical disk unit 1 of this embodiment can execute both recording and reproducing operations to and from the optical disk 2. For example, when information is recorded into the optical disk 2, in the first-executed target retrieval operation, the optical head 6 is carried to the beginning of a record area of the optical disk 2 by means of the sledge mechanism 16, and in a recording or reproducing operation executed after the completion of this operation, the sledge mechanism 16 moves the optical head 6 in the forward direction so that the optical head 6 follows a track of the optical disk 2 and the actuator 15 displaces the object lens 12.

In the optical disk unit 1 of this first embodiment, as shown in FIG. 7, the optical head 6 is simply moved in the forward direction to start the recording or reproducing operation if the optical head 6 is last moved in the forward direction in the target retrieval operation, while the moving direction of the optical head 6 is modified to the forward direction before starting the recording or reproducing operation if the optical head 6 is last moved in the backward direction in the target retrieval operation.

Accordingly, there is no start of a recording or reproducing operation when the optical head 6 inverts the moving direction of the optical head 6, but there is a start of a recording or reproducing operation after the moving direction of the optical head 6 is modified. Thus, vibration or shock due to the inversion of the moving direction of the optical head 6 is not applied to the object lens 12 when the information is recorded or reproduced. Consequently, the information can be recorded or reproduced without loss, particularly at the beginning of the recording operation.

Figure 8A:
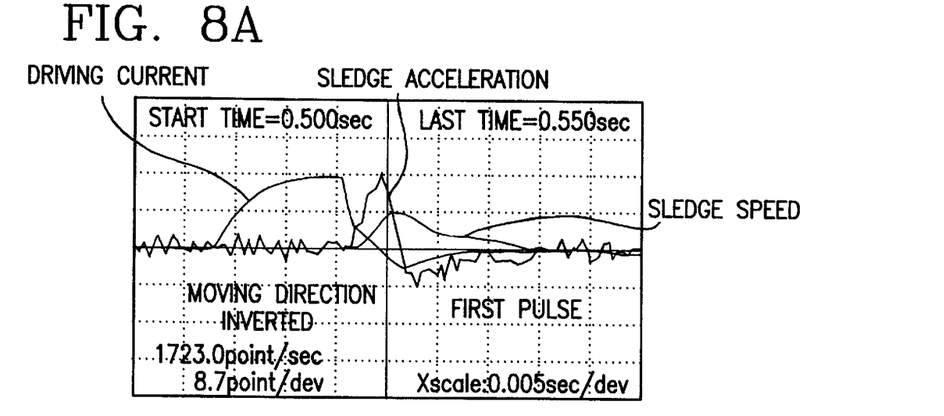
FIG. 8(a) is a timing diagram illustrating a state immediately after the moving direction of the optical head is reversed and FIG. 8(b) and FIG. 8(c) are timing diagrams illustrating subsequent states.

FIG. 8(a) illustrates a state immediately after the moving direction of the optical head 6 is inverted by a first pulse of a sledge driving current for driving the sledge mechanism 16, showing an extremely large sledge acceleration and a delayed occurrence of sledge speed. The large sledge acceleration leads to a vibration or a shock applied to the object lens 12 and the delayed occurrence of the sledge speed prevents the optical head 6 from following the track of the optical disk favorably, hence information cannot be recorded or reproduced favorably in this state.

Figure 8B:
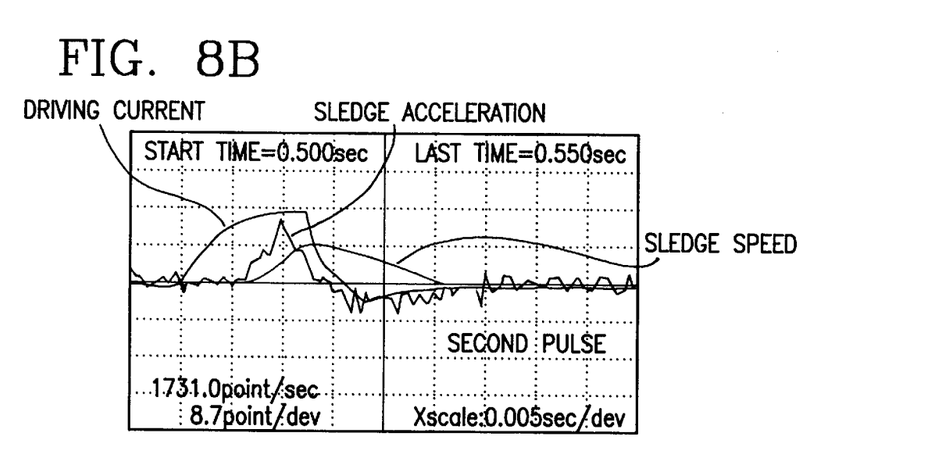
Figure 8C:
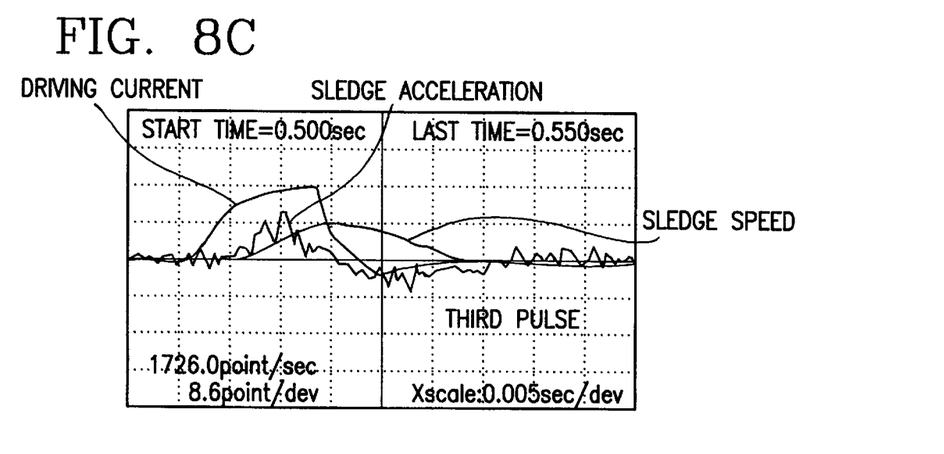

On the other hand, FIGS. 8(b) and 8(c) illustrate what occurs when the optical head 6 is moved from the above state by second and third pulses of the sledge driving current, respectively, showing the sledge acceleration lowered and the sledge speed rapidly generated, hence information can be recorded or reproduced favorably in these states. In this manner, the optical disk unit 1 of this embodiment controls the sledge driving current for driving the sledge mechanism 16 to modify the moving direction of the optical head 6 so that it first moves the optical head 6 in a forward direction before starting the recording or reproduction of information.

This invention is not limited to the above embodiment, as many modifications can be made. For example, although this first embodiment shows the optical disk unit 1 executing both recording and reproducing operations of information to and from the optical disk 2, it is possible to employ the invention with an optical disk unit 1 which executes just one of these operations. Thus, it is also possible to limit the modification to the moving direction of the optical head 6 to the recording operation only. Since a time is required for modifying the moving direction of the optical head 6, the operation of the optical disk unit 1 is delayed if the modification of the driving direction is executed every time a recording or reproducing is to occur. Moreover, even if an error is caused by an inverted moving direction of the optical head 6 in reproducing information, it can be compensated for by repeating the reproduction; hence if an error rate is relatively low, the reproducing operation can be rapidly started by omitting the modification of the driving direction of the optical head 6 for a reproducing operation.

In the first embodiment, when the sledge mechanism moves in a reverse direction to reach a target position it is then moved in a forward direction to reach a target position before a recording or reproducing operation is begun. This movement in the forward direction is accomplished by one or more normal step movements of the sledge mechanism. For example, if a target location has an address of 00:00, the sledge is moved reversely to the location −02:00 and then forwardly to the target position 00:00 in one movement. However, it is also possible to move the sledge mechanism forward in small increments, for example, from −02:00 to −01:30, from −01:30 to −1:00, from −1:00 to −00:30 and from −00:30 to 00:00, by appropriate control of the sledge driving current. Once the sledge reaches the target location of 00:00 recording or reproducing then begins.

Figure 9:
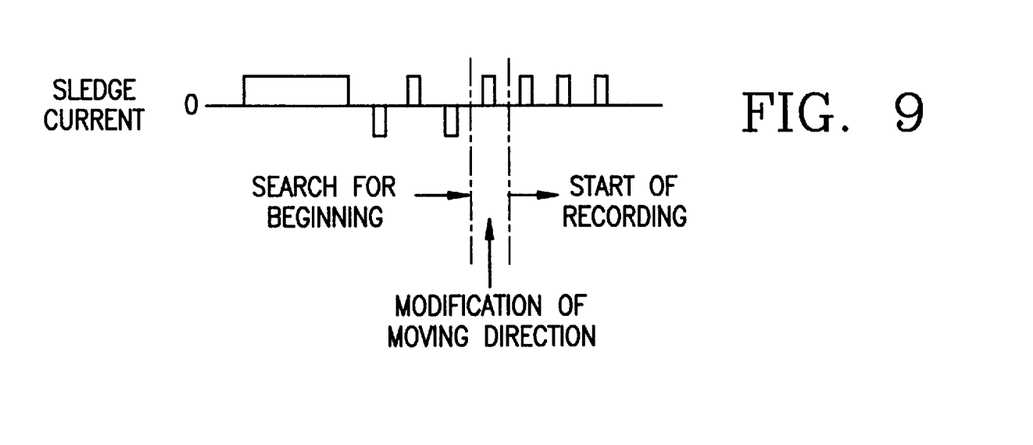
FIG. 9 is a timing diagram illustrating a sledge driving current of an alternate embodiment; and, FIGS. 10(a), 10(b) illustrating a relationship between the optical disk and an optical head of another alternate embodiment.

Furthermore, in the first embodiment, the optical head 6 is moved preparatively in the forward direction to the target position of the optical disk 2 by moving the optical head 6 in the backward direction once and then modifying it to the forward direction, but this reciprocating motion requires much time. If it is a problem, then as a second embodiment preferably the sledge driving current required for modifying the moving direction of the optical head 6 is limited to a single pulse, as shown in FIG. 9, and the optical head 6 is moved preparatively in the forward direction as shown in FIG. 3(c) after the time when the optical head 6 has arrived at a target position as shown in FIG. 3(a), and further the object lens 12 is displaced in the reverse direction in synchronization with it to begin a recording or reproducing operation. In this operation, the moving direction of the optical head 6 can be modified with the object lens 12 following the target position since the time when the optical head 6 arrives at the target position of the optical disk and the optical head 6 need not be reciprocated in the reverse and forward directions from the target position, hence a required time for the preparative operation can be reduced.

Figures 10A, 10B:
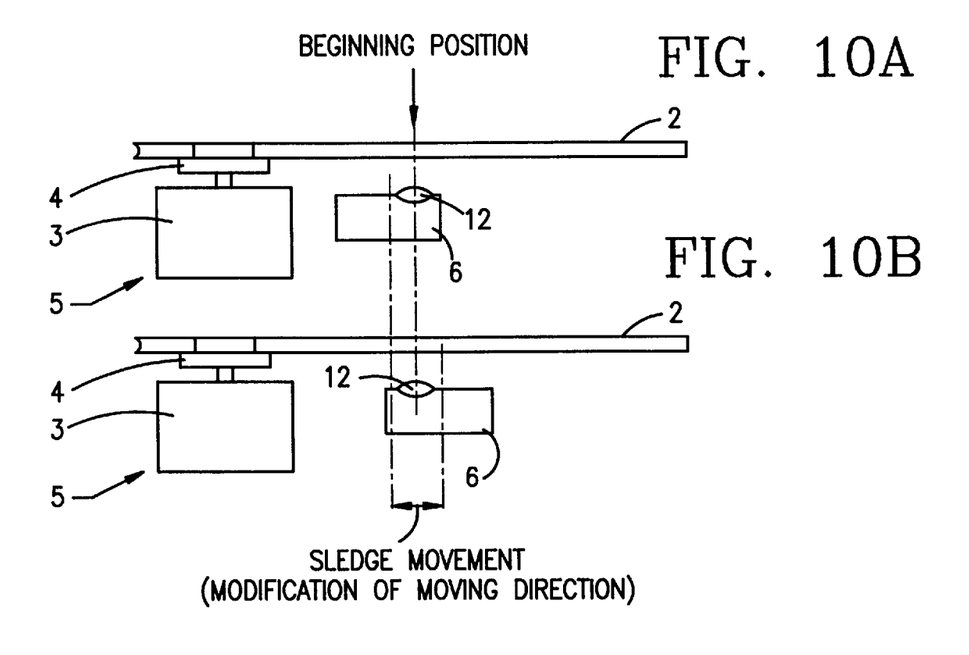

To start the operation rapidly in this manner, the location of the optical head 6 must be within a working range of a minute displacement of the object lens 12 and the sledge mechanism 16 requires a fine precision for realizing it. If it is hard to obtain the precision, preferably the head control means causes the lens driving mechanism (actuator 15) to displace the object lens in the forward direction before the optical head 6 is moved to the target position of the optical disk 2, as shown in FIG. 10a. In this condition, a range for modifying the moving direction of the optical head 6 is expanded to the maximum moving range of the object lens 12, shown by comparing FIGS. 10a and 10b, and therefore the precision required for the sledge mechanism 16 can be reduced.

Since the operation control means is provided for starting a recording or reproduction of the information after the optical head is preparatively moved in the forward direction (FIG. 10b) by means of the head carrying mechanism when the optical head moves to the target position of the optical disk in a direction reverse to the forward direction, information recording or reproduction is not started when the optical head inverts the moving direction. Consequently, no vibration or shock due to the inverted moving direction of the optical head is applied to the object lens when recording or reproducing information.

Moreover, as with the first embodiment, the operation control means in the second embodiment can be operated to function only when recording information into the optical disk, so a loss of the beginning of information to be recorded into the optical disk is reliably prevented and a delay is prevented in the operation for reproducing the information from the optical disk.

Still further, since the operation control means also displaces the object lens in the reverse direction by means of the lens driving mechanism when the optical head is moved preparatively in the forward direction, and the moving direction of the optical head can be modified with the object lens having been placed at the target position when the optical head arrives at the target position the recording or reproducing operation can be executed at a high speed.

Still further, the control means can cause actuator 15 to displace the object lens in the forward direction by means of the lens driving mechanism before the optical head is moved in a reverse direction to the target position of the optical disk by means of the head carrying mechanism and therefore the maximum moving range of the object lens is obtained as a range for modifying the moving direction of the optical head, the precision required for the head carrying mechanism can be lowered.

While preferred embodiments of the invention have been described and illustrated, it should be understood that many modifications may be made without departing from the spirit of the invention. Accordingly, the invention is not limited by the foregoing description but is only limited by the scope of the appended claims.

We claim:

1. An optical disk unit comprising:

a rotation driving mechanism for rotating an optical disk, an optical head having a light emitting element, a light receiving element, an object lens, and a lens driving mechanism, a head carrying mechanism for supporting and moving the optical head enabling it to move freely in a radial direction relative to said rotation driving mechanism, said optical head executing at least one of recording and reproduction of information by optically scanning a spiral track of an optical disk by said head carrying mechanism moving said optical head to a target position of the optical disk, said head carrying mechanism moving said optical head in a forward direction in accordance with a significant movement of the track, said lens driving mechanism displacing said object lens appropriately in accordance with a fine displacement of the track, and an operation controller for starting a recording or reproduction of information by said optical head after said optical head is first moved preparatively in a forward direction by means of said head carrying mechanism if said optical head is moved to the target position in a direction reverse to the forward direction.

2. An optical disk unit as defined in claim 1, wherein said optical head executes both a recording and reproduction of information and said operation controller functions only when said optical head is recording information onto the optical disk.

3. An optical disk unit as defined in claim 2, wherein said operation controller causes displacement of the object lens in the backward direction relative to the head carrying mechanism by means of the lens driving mechanism when the optical head is moved preparatively in the forward direction by means of the head carrying mechanism.

4. An optical disk unit as defined in claim 3, wherein said operation controller causes the displacement of the object lens in the forward direction by means of the lens driving mechanism before the optical head is moved to the target position of the optical disk by means of the head carrying mechanism.

5. An optical disk unit as defined in claim 3, wherein said optical head executes both a recording and reproduction of information and said operation controller functions only when said optical head is recording information onto the optical disk.

6. An optical disk unit as defined in claim 4, wherein said optical head executes both a recording and reproduction of information and said operation controller functions only when said optical head is recording information onto the optical disk.

7. An optical disk unit as in claim 1 wherein said operation controller, if said optical head is moved to said target position in a reverse direction, causes said head carrying mechanism to move in said reverse direction and then in said forward direction before a recording or reproducing operation is started.

8. An optical disk unit as in claim 1 wherein said operation controller, if said optical head is moved to said target position in a reverse direction, causes said head carrying mechanism to move in said forward direction before a recording or reproducing operation is started.

9. An optical disk unit as in claim 1 wherein said head carrying mechanism moves said optical head in a reverse direction past said target position and then moves said optical head in said forward direction to said target position.

10. An optical disk unit as in claim 9 wherein said head carrying mechanism moves said optical head in said forward direction to said target position in a single step.

11. An optical disk unit as in claim 9 wherein said head carrying mechanism moves said optical head in said forward direction to said target position in a series of incremental steps.

12. An optical disk unit comprising:

a rotation driving mechanism for rotating an optical disk, an optical head having a light emitting element, a light receiving element, an object lens, and a lens driving mechanism, a head carrying mechanism for supporting and moving the optical head enabling it to move freely in a radial direction relative to said rotation driving mechanism, said optical head executing at least one of recording and reproduction of information by optically scanning a spiral track of an optical disk by said head carrying mechanism moving said optical head to a target position of the optical disk, said head carrying mechanism moving said optical head in a forward direction in accordance with a significant movement of the track, said lens driving mechanism displacing said object lens appropriately in accordance with a fine displacement of the track, and an operation controller for starting a recording or reproducing of information by said optical head after said optical head is first moved preparatively in a forward direction by means of said head carrying mechanism if said optical head is moved to the target position in a direction reverse to the forward direction, said operation controller causing a displacement of the object lens in a reverse direction by a lens driving mechanism in association with movement of said optical head by said head carrying mechanism in said forward direction.

13. An optical disk unit as in claim 12 wherein said operation controller causes said lens driving mechanism to move said object lens in a forward direction before displacement of said object lens in a reverse direction.

* * * * *